United States Patent
Ito et al.

(10) Patent No.: US 10,248,137 B2
(45) Date of Patent: Apr. 2, 2019

(54) METHOD FOR CONTROLLING FLOW RATE OF FLUID, MASS FLOW RATE CONTROL DEVICE FOR EXECUTING METHOD, AND MASS FLOW RATE CONTROL SYSTEM UTILIZING MASS FLOW RATE CONTROL DEVICE

(71) Applicant: Hitachi Metals, Ltd., Minato-ku, Tokyo (JP)

(72) Inventors: Hiroyuki Ito, Mie (JP); Koji Hashimoto, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 223 days.

(21) Appl. No.: 15/325,951

(22) PCT Filed: Jul. 14, 2015

(86) PCT No.: PCT/JP2015/070158
§ 371 (c)(1),
(2) Date: Jan. 12, 2017

(87) PCT Pub. No.: WO2016/010035
PCT Pub. Date: Jan. 21, 2016

(65) Prior Publication Data
US 2017/0168509 A1 Jun. 15, 2017

(30) Foreign Application Priority Data
Jul. 15, 2014 (JP) .................................. 2014-144926

(51) Int. Cl.
G05D 7/06 (2006.01)
(52) U.S. Cl.
CPC .................................. G05D 7/0635 (2013.01)

(58) Field of Classification Search
CPC ........... G05D 7/0623; G05D 7/00; G05D 3/12
See application file for complete search history.

(56) References Cited

U.S. PATENT DOCUMENTS 9,797,520 B2 * 10/2017 Ohtsuki ............... G05D 7/0635
2001/0004903 A1 6/2001 Ohmi et al.
(Continued)

FOREIGN PATENT DOCUMENTS

CN 101583916 A 11/2009
JP 01055487 A * 3/1989
(Continued)

OTHER PUBLICATIONS

Machine translation of JP-H-08335118 A which originally published on Dec. 17, 1996. (Year: 1996).*

*Primary Examiner* — David A Rogers
(74) *Attorney, Agent, or Firm* — Neugeboren O'Dowd PC

(57) ABSTRACT

A control operation of correcting, based on a difference between a target value and a measured value of a controlled response time, a standby time from change in a set value of a flow rate to a value that is not zero until start of output of an opening signal is repeated. As a result, a response time for the flow rate to reach the set value of the flow rate after the set value changes can be a desired value independently of a type, the set flow rate, the temperature, and the pressure of fluid, individual differences among devices, and the like. The difference between the target value and the measured value of the controlled response time may be multiplied by a weight coefficient, and the control operation may be carried out for each of a predetermined plurality of ranges of the flow rate.

8 Claims, 3 Drawing Sheets

(56) References Cited

U.S. PATENT DOCUMENTS

| | | | |
|---|---|---|---|
| 2002/0179149 A1 | 12/2002 | Ohmi et al. | |
| 2004/0074311 A1* | 4/2004 | Lull | G01F 1/696 73/861 |
| 2004/0154664 A1 | 8/2004 | Ohmi et al. | |
| 2011/0015791 A1* | 1/2011 | Smirnov | G01F 1/696 700/282 |

FOREIGN PATENT DOCUMENTS

| | | | |
|---|---|---|---|
| JP | 08335118 A | * | 12/1996 |
| JP | 2000305630 A | | 11/2000 |
| WO | 2013115298 A1 | | 8/2013 |

\* cited by examiner

METHOD FOR CONTROLLING FLOW RATE OF FLUID, MASS FLOW RATE CONTROL DEVICE FOR EXECUTING METHOD, AND MASS FLOW RATE CONTROL SYSTEM UTILIZING MASS FLOW RATE CONTROL DEVICE

BACKGROUND

Field

The present invention relates to a method of controlling a flow rate of fluid, a mass flow rate control device (mass flow controller) for executing the method, and a mass flow rate control system (mass flow control system) utilizing the mass flow controller. For example, the present invention relates to a method of controlling a flow rate of fluid, which can appropriately be utilized for control of start and stop of supply of a process gas to a semiconductor manufacturing apparatus and control of a supply amount thereof, a mass flow controller for executing the method, and a mass flow rate control system utilizing the mass flow controller.

Background

The mass flow rate control device (mass flow controller) is widely used, for example, in order to control a flow rate of a process gas supplied to an inside of a chamber in a manufacturing process for a semiconductor. The mass flow controller is used not only solely, but also as a component for constructing a mass flow control system including a combination of a plurality of mass flow controllers and other components.

The mass flow controller generally includes a flow meter serving as means for measuring the flow rate, a flow control valve serving as means for controlling the flow rate, and a controlling section for controlling those means. A user opens the flow control valve to start supply of fluid (for example, process gas) when the fluid needs to be supplied, and closes the flow control valve to stop the supply of the fluid when the supply of the fluid becomes no longer necessary. Moreover, the flow rate of the fluid can be measured by the flow meter while the flow control valve is opened, and opening of the flow control valve can be controlled in accordance with the measured value of the flow rate.

In the manufacturing process for a semiconductor, semiconductor devices each having a fine and complex structure are manufactured by supplying various types of process gases to the inside of the chamber. It is desired to decrease a period from transmission of a signal from the controlling section to the flow control valve until actual start or stop of the supply of the fluid as much as possible in order to supply a required type of process gas in a required amount at a required time point. In order to satisfy this requirement, there are proposed various technologies for opening/closing the flow control valve of the mass flow controller at high speed without a delay.

For example, in WO 2013/115298 A1, there is disclosed an invention of a flow control device and a program for enabling high-speed flow rate response, which was proposed by the applicant of the present invention. With the invention disclosed in WO 2013/115298 A1, a period required for bringing the flow control valve from a closed state to an open state can be decreased by, for example, outputting a spike voltage signal from a drive circuit to a flow control valve.

SUMMARY

An aspect includes a method of controlling a flow rate of fluid according to one embodiment of the present invention is applied to a mass flow controller including: a flow meter configured to measure a measured value of a flow rate of fluid; a flow control valve configured to increase/decrease the flow rate; and a controlling section configured to control the flow control valve based on the measured value to adjust the flow rate.

Further, the controlling section includes storage means for storing the following parameters:
(1) a set value of the flow rate;
(2) a controlled value of the flow rate corresponding to the set value of the flow rate;
(3) a standby time W, which is a period from change in the set value of the flow rate from zero to a value that is not zero until output of an opening signal to the flow control valve; and
(4) a target value Tt of a controlled response time, which is a period for the measured value of the flow rate to reach the controlled value of the flow rate after the set value of the flow rate changes from zero to the value that is not zero.

In addition, the method of controlling a flow rate of fluid according to one embodiment of the present invention includes the following first to sixth steps:

the first step: starting, by the controlling section, measurement of an elapsed time when the set value of the flow rate changes from zero to the value that is not zero;

the second step: outputting, by the controlling section, the opening signal corresponding to the set value of the flow rate to the flow control valve when the elapsed time reaches the standby time W;

the third step: measuring, by the controlling section, a value of the elapsed time at a time when the measured value of the flow rate reaches the controlled value of the flow rate as a measured value Tm of the controlled response time;

the fourth step: calculating, by the controlling section, a value acquired by subtracting the measured value Tm from the target value Tt as a differential value ΔW of the standby time W;

the fifth step: outputting, by the controlling section, a closing signal to the flow control valve, stopping the measurement of the elapsed time, and resetting the value of the elapsed time to zero when the set value of the flow rate changes from the value that is not zero to zero; and the sixth step: updating, by the controlling section, a value of the standby time W to a value acquired by adding the differential value ΔW to the standby time W.

The standby time W is updated each time a control operation including the above-mentioned respective steps is repeated, and thus the measured value Tm of the controlled response time infinitely approaches the target value Tt. Therefore, the problem of the variation of the response time is solved.

In a method of controlling a flow rate of fluid according to a preferred embodiment of the present invention, the fourth step includes calculating, by the controlling section, as the differential value ΔW of the standby time, a value acquired by multiplying by a weight coefficient the value acquired by subtracting the measured value Tm from the target value Tt. A speed (required number of the repetitions of the control operation) at which the measured value Tm approaches the target value Tt can be appropriately adjusted by multiplying the weight coefficient. Therefore, the controlled response time can be effectively prevented from being excessively corrected due to unexpected factors, for example, noise on a signal, and thus the operation of the mass flow controller can be more stabilized.

Further, a method of controlling a flow rate of fluid according to another preferred embodiment of the present invention is applied to a mass flow controller in which the controlling section is configured to store the controlled value of the flow rate, the standby time W, and the target value Tt corresponding to each of a predetermined plurality of ranges of the flow rate. In the method, the second, third, fourth, and sixth steps include using, by the controlling section, the controlled value of the flow rate, the standby time W, and the target value Tt corresponding to a range including the set value of the flow rate out of the predetermined plurality of ranges of the flow rate. Irrespective of whether the set value of the flow rate is high or low, the same response time can be achieved by selectively using the controlled value of the flow rate, the standby time W, and the target value Tt in accordance with (the range of) the set value of the flow rate in this way. Therefore, the operation of the mass flow controller can be further stabilized.

The present invention also relates to the mass flow controller for executing the method of controlling a flow rate of fluid. With the mass flow controller according to the present invention, it is possible to solve the problem of the variation of the response time caused by the type of the fluid (for example, the process gas), the setting conditions, the individual differences, and the like. In addition, the present invention also relates to a mass flow control system utilizing one or more of the mass flow controllers according to the present invention. With this configuration, for example, even in a system including a plurality of types of process gas supply lines, the controlled response time of each of the mass flow controllers can infinitely be brought close to an arbitrary target value Tt.

DETAILED DESCRIPTION

Technical Problem

Figure 1:
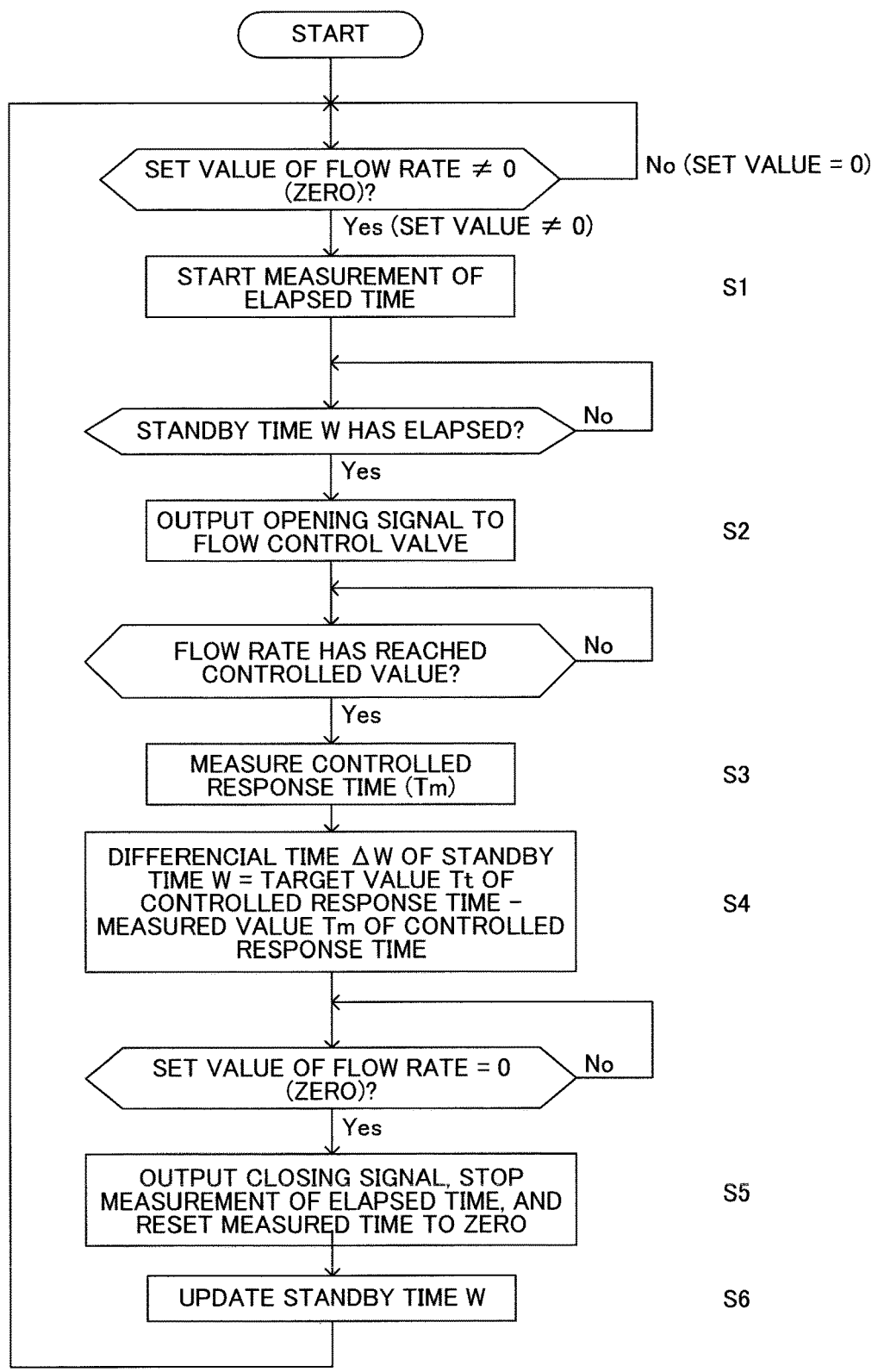
FIG. 1 is a flowchart for illustrating a control operation carried out by a controlling section in a method of controlling a flow rate of fluid according to the present invention.

As described above, with the related art, the period required for opening/closing operation of the flow control valve can be decreased within a certain range. However, a certain period is necessary to bring the flow control valve including mechanical components from the closed state to the open state, and a certain period is also necessary for the mass flow rate of the fluid to change in response to the opening/closing operation of the flow control valve. Thus, it is impossible to completely decrease to 0 (zero) a period (hereinafter referred to as "response time") for the flow rate of the fluid to reach a set value of the flow rate of the mass flow controller after the set value changes from 0 (zero) to a value that is not 0 (zero).

Rather, it may be more preferred to have a constant response time independently of the type of fluid (for example, process gas), the set value of the flow rate, and conditions including temperature and pressure (hereinafter also referred to as "set conditions") than to infinitely bring the response time close to 0 (zero). As a method of achieving the constant response time, for example, such a method is conceivable as measuring, in advance, the response time under various set conditions for each of all types of fluid that are likely to be used, and providing, when the signal is transmitted to the flow control valve, a standby time acquired by subtracting a measured value of the response time from a target value of the response time set in advance. However, such a method imposes large temporal and economical loads on the measurement of the response times under the various set conditions, and is thus not practical.

Moreover, in a case of a mass flow control system utilizing a plurality of mass flow controllers, the response time may vary depending on the mass flow controller even for the same type of fluid and the same set conditions. When individual differences exist among the mass flow controllers, the mass flow control system as a whole has a variation of the response time, which is not preferred.

The present invention has been made in view of the above-mentioned problems, and therefore has an object to provide a method of controlling a flow rate of fluid, a mass flow controller for executing the method, and a mass flow control system utilizing the mass flow controller, which do not present a difference in response time caused by the type of fluid (for example, process gas), set conditions, individual differences, and the like.

A detailed description is now given of embodiments of the present invention referring to the drawings. The embodiments of the present invention described herein are provided in order to describe contents of the present invention more specifically, and the present invention is not limited to the embodiments described herein and illustrated in the drawings.

A method of controlling a flow rate of fluid according to the present invention is applied to a mass flow controller including a flow meter, a flow control valve, and a controlling section. The flow meter is configured to measure a measured value of a flow rate of fluid. In other words, the flow meter is configured as means for measuring a flow rate of fluid to be controlled, and, more specifically, can be constructed by publicly-known flow rate measurement means such as a thermal flow meter and a differential pressure flow meter. The flow control valve is configured to increase/decrease the flow rate. In other words, the flow control valve is constructed by means for controlling the flow rate of the fluid to be controlled, and, more specifically, can be constructed by a valve body for opening/closing a flow passage of the fluid, and a piezoelectric element, a solenoid coil, or the like for driving the valve body. The controlling section is configured to control the flow control valve based on the measured value, thereby adjusting the flow rate. In other words, the controlling section is constructed as means for controlling all the components constructing the mass flow controller, and, more specifically, can be constructed by a calculation device for sending/receiving signals to/from each component and carrying out calculation processing, input/output means, a storage device, and the like.

The controlling section includes storage means for storing: a set value of the flow rate; a controlled value of the flow rate corresponding to the set value of the flow rate; a standby time W, which is a period from change in the set value of the flow rate from zero to a value that is not zero until output of an opening signal to the flow control valve; and a target value Tt of a controlled response time, which is a period for the measured value of the flow rate to reach the controlled value of the flow rate after the set value of the flow rate changes from zero to a value that is not zero. Any of those values is a parameter required to execute the "method of controlling a flow rate of fluid according to the present invention". The storage means can be constructed by, for example, the above-mentioned storage device, or the like. In the following description, the operation of the controlling section for carrying out control required to execute the "method of controlling a flow rate of fluid according to the present invention" is also referred to as "the control operation by the controlling section."

The set value of the flow rate is a target value of the flow rate of the fluid to be controlled by the mass flow controller. The set value of the flow rate, for example, can be input by a user via input/output means included in the controlling section, and can be stored in the storage means included in the controlling section. Alternatively, the set value of the flow rate may be stored in advance in the storage means included in the controlling section. Further, the set value of the flow rate stored in the storage means can be updated by the set value of the flow rate input by the user via the input/output means.

While the set value of the flow rate stored in the controlling section is 0 (zero), the control operation by the controlling section is not carried out, and hence the opening signal is not output to the flow control valve. Thus, the fluid does not flow. When the set value stored in the controlling section changes from 0 (zero) to a value that is not 0 (zero), the control operation by the controlling section is carried out, and hence the opening signal is output to the flow control valve. Thus, the fluid flows. While the controlling section is carrying out the control operation, the mass flow controller uses a publicly-known method to control opening of the flow control valve so that the measured value of the flow rate of the fluid matches the set value. The set value of the flow rate is set in a unit, for example, the standard liter per minute.

The controlled value of the flow rate corresponding to the set value of the flow rate is defined for each set value of the flow rate set to a value that is not 0 (zero). The controlled value of the flow rate, for example, can also be input by the user via the input/output means included in the controlling section, and can be stored in the storage means included in the controlling section. Alternatively, the controlled value of the flow rate can be derived from the set value of the flow rate as described in detail later. The controlled value of the flow rate stored in the storage means can be updated to the controlled value of the flow rate input by the user via the input/output means or the controlled value of the flow rate derived from the set value of the flow rate.

When the set value of the flow rate is 0 (zero), the control operation by the controlling section is not carried out, and hence the controlled value of the flow rate does not need to be defined. An elapsed time for the measured value of the flow rate to reach the controlled value of the flow rate after the set value of the flow rate changes from 0 (zero) to a value that is not 0 (zero) is referred to as "controlled response time", and a measured value thereof is denoted by reference symbol Tm. When the controlled value of the flow rate is set to 0 (zero), the measured value Tm of the controlled response time also becomes 0 (zero), and hence the control operation by the controlling section cannot be carried out. Thus, the controlled value of the flow rate needs to be set to a value more than 0 (zero). Moreover, when the controlled value of the flow rate is the same as the set value of the flow rate, and the measured value of the flow rate never reaches the set value for some reason, the measured value Tm of the controlled response time becomes much more than a target value (target value Tt described later) thereof, and the control operation by the controlling section becomes unstable. Thus, the controlled value of the flow rate is preferably a value less than the set value of the flow rate.

Various methods can be employed as a method of defining the controlled value of the flow rate corresponding to the set value of the flow rate. For example, a value acquired by subtracting a constant value from the set value of the flow rate may be the controlled value of the flow rate, or a value acquired by multiplying the set value of the flow rate by an arbitrary value more than 0 (zero) and less than 1 may be the controlled value of the flow rate. In the latter case, the multiplier for the set value of the flow rate may be set to a value close to 0 (zero), but, in this case, the controlled value of the flow rate is considered to be reached even when the measured value of the flow rate is substantially smaller than the set value, which is not preferred. Thus, the multiplier for the set value of the flow rate is preferably set in a range equal to or more than 0.50 and less than 1. A more preferred range is equal to or more than 0.70 and equal to or less than 0.98. Further, the controlled value of the flow rate may be defined in correspondence to the set value of the flow rate in accordance with a method stored in advance in the storage means included in the controlling section.

The standby time is a period from change in the set value of the flow rate from 0 (zero) to the value that is not 0 (zero) until start of the output of the opening signal by the controlling section to the flow control valve, and is denoted by reference symbol W. The standby time W is not always a constant value, and is updated to a new value each time the control operation by the controlling section is repeated. The standby time W at the time when the control operation by the controlling section is carried out for the first time is referred to as "initial value", and this initial value is used to carry out the control operation for the first time. The controlling section is configured to receive and store input of the standby time W, and use the standby time W as the initial value in principle, but this input may be omitted. When the input of the standby time W is omitted, the controlling section can set an appropriate value including 0 (zero) stored in the storage means in advance as the initial value of the standby time W.

The target value of the controlled response time is the target value of the period for the measured value of the flow rate to reach the controlled value of the flow rate after the set value of the flow rate changes from 0 (zero) to a value that is not 0 (zero), and is denoted by reference symbol Tt. The controlled response time corresponds to the above-mentioned response time (period for the flow rate to reach the set value of the flow rate after the set value of the flow rate of the mass flow controller changes from 0 (zero) to the value that is not 0 (zero)). When the controlled value of the flow rate is the same value as the set value of the flow rate, the controlled response time is equal to the response time. When the controlled value of the flow rate is less than the set value of the flow rate, the controlled response time is less than the response time.

When the controlled value of the flow rate is not greatly different from the set value of the flow rate, the controlled response time is not greatly different from the response time either, and the controlled response time is thus a rough estimate of the length of the response time. For example, as shown in an example of FIG. 5 described in detail later, when the controlled value of the flow rate is set to 0.90 time the set value of the flow rate, and the target value Tt of the controlled response time is set to 1.0 s (second) to carry out the above-mentioned control operation, a resulting achieved response time is a period slightly longer than 1.0 s. The length of the response time can be brought close to the desired length by appropriately setting the target value Tt of the controlled response time in this way.

Moreover, the target value Tt of the controlled response time is preferably set to a period equal to or more than the longest period out of periods each for the flow rate to reach the controlled value after the controlling section outputs the opening signal under predicted set conditions in the mass flow controller. This setting enables the controlled response time to infinitely approach the target value Tt under the planned setting conditions.

The above-mentioned four values (the set value and the controlled value of the flow rate of the fluid, the standby time, and the target value of the controlled response time) are, for example, input by the user via the input/output means before the control operation starts, or stored as initial values in the storage means included in the controlling section in advance. Those values are stored in the storage means for reference by the calculation device each time the necessity arises.

Advantageous Effects of Invention

With the method of controlling a flow rate of fluid, the mass flow controller, and the mass flow control system according to the present invention, the response time from reception of the set value of the flow rate until the measured value of the flow rate reaches the set value can infinitely be brought close to the target value that can be arbitrarily set by the user. Thus, the problem of the variation of the response time caused by the type of the fluid, the setting conditions, and the individual differences among the devices can be solved. Moreover, when the mass flow controller according to the present invention is used to build the mass flow control system, reproducibility of a semiconductor manufacturing process and the like are expected to be improved compared with the related art.

A description is now given of the control operation carried out by the controlling section. FIG. 1 is a flowchart for illustrating the control operation by the controlling section. The control operation according to the present invention includes six steps from a first step to a sixth step. The control operation may be changed in the sequence of the execution of the six steps exemplified herein, may include steps other than those steps, or may omit a unit of the steps as long as the gist of the present invention is not changed.

The first step (S1) is a step of starting the measurement of the elapsed time when the set value of the flow rate changes from 0 (zero) to a value that is not 0 (zero). The flow control valve maintains the closed state while the flow rate set value is 0 (zero). When the flow rate set value changes from 0 (zero) to a value that is not 0 (zero), the controlling section starts the measurement of the elapsed time from this change, and then continues the measurement of the elapsed time until the measurement of the elapsed time is stopped at the fifth step.

The second step (S2) is a step of outputting the opening signal corresponding to the set value of the flow rate to the flow control valve when the elapsed time reaches the standby time W. The "standby time W" in this case means the initial value of the standby time W received by the controlling section or set by the controlling section when the controlling section carries out the control operation for the first time, and means the standby time W updated in the sixth step (S6) of the control operation carried out previously when the controlling section carries out the control operation for the second time or later.

Moreover, the "opening signal" refers to a signal provided from the controlling section to the flow control valve in order to bring the flow control valve from the closed state to the open state, and to maintain the open state of the flow control valve. For example, in a case where a flow control valve of the normally-open type is used, the flow control valve is fully opened when the output is 0 (zero). Thus, the opening signal includes, for example, a case where the output is 0 (zero). When a piezoelectric element is used to drive the valve body of the flow control valve, a voltage signal can be used as the opening signal. When a solenoid coil is used, a current signal can be used as the opening signal. The output of the opening signal started in the second step is continued until the output is stopped in the fifth step described later.

Figure 2:
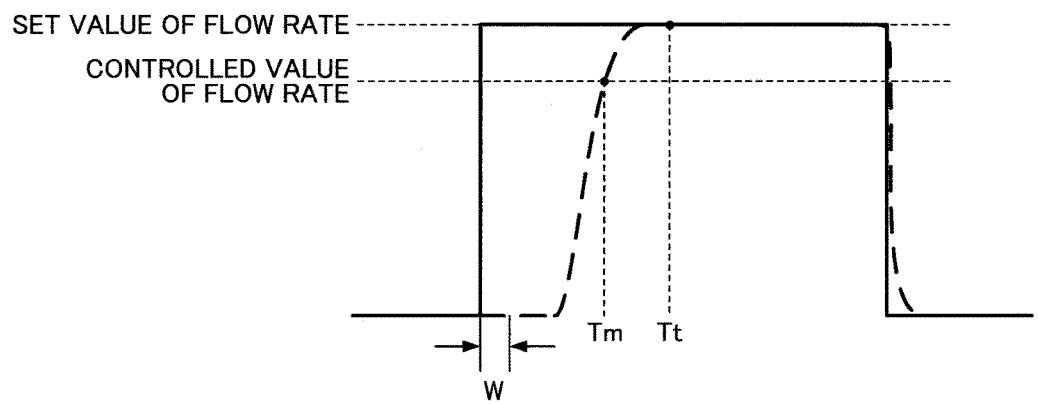
FIG. 2 is a schematic diagram for illustrating a control operation carried out for the first time in the method of controlling a flow rate of fluid according to the present invention.

The third step (S3) is a step of measuring the value of the elapsed time at the time when the measured value of the flow rate reaches the controlled value of the flow rate as the measured value Tm of the controlled response time. Referring to FIG. 2, FIG. 2 is a schematic diagram for illustrating the control operation carried out for the first time according to the present invention. The horizontal axis represents the elapsed time. The vertical axis represents the flow rate (the set value, the controlled value, and the measured value). A graph represented by the solid line (constructed by a rectangle) represents a state where the set value of the flow rate is set from 0 (zero) to a value that is not 0 (zero) (S1), and is set again to 0 (zero) after a certain time has elapsed (S5). A graph represented by the broken line (including curves) represents a change in the measured value of the flow rate, which is measured by the flow meter. When the standby time W has elapsed after the set value of the flow rate is set from 0 (zero) to a value that is not 0 (zero), the output of the opening signal to the flow control valve is started (S2). The elapsed time at the time when the flow rate reaches the controlled value (in FIG. 2, value acquired by multiplying the set value of the flow rate by 0.90) is measured as the measured value of controlled response time. The measured value is denoted by reference symbol Tm.

The fourth step (S4) is a step of calculating a value acquired by subtracting the measured value Tm from the target value Tt of the controlled response time as a differential value $\Delta W$ of the standby time W. Various methods are conceivable as a method of bringing (the measured value Tm of) the controlled response time close to the target value Tt, but in the present invention, a method of updating the standby time W is employed as a specific method. More specifically, the measured value Tm of the controlled response time in the operation for the next time or later can be brought close to the target value Tt by adding to the standby time W the value (that is, the differential value $\Delta W$) acquired by subtracting the measured value Tm from the target value Tt of the controlled response time, and employing the added value as a new standby time W. The fourth step is a step of acquiring the differential value $\Delta W$ of the standby time W out of the series of the adjustment operations.

Referring back to FIG. 2, the measured value Tm of the controlled response time is less than the target value Tt, and a difference thus exists therebetween in FIG. 2. Thus, a value acquired by subtracting the measured value Tm from the target value Tt of the controlled response time is calculated, and the value is considered as the differential value ΔW of the standby time W.

The fifth step (S5) is a step of outputting the closing signal to the flow control valve, stopping the measurement of the elapsed time, and resetting the measured time to 0 (zero) when the set value of the flow rate changes from the value that is not 0 (zero) to 0 (zero). The "closing signal" refers to a signal for bringing the flow control valve from the open state to the closed state, and maintaining the closed state of the flow control valve. For example, in a case where a flow control valve of the normally-closed type is used, the flow control valve is fully closed when the output is 0 (zero). Thus, the closing signal includes, for example, a case where the output is 0 (zero). A voltage signal or a current signal can be used as the closing signal as in the case of the opening signal. The output of the closing signal started in the fifth step continues until the output of the opening signal in the second step in the next control operation.

A reason for resetting the elapsed time to 0 (zero) is to set the elapsed time measured in the previous control operation to 0 (zero), thereby newly starting the measurement of the elapsed time from the change in the set value of the flow rate again from 0 (zero) to a value that is not 0 (zero) as a start point. Steps that use the value of the elapsed time in one control operation are the first step to the third step. Thus, a timing at which the measurement of the elapsed time is stopped and the value is reset may be any timing between completion of the third step and start of the sixth step, and the stop and the reset may be executed at respective different timings.

The six step (S6) is a step of updating the value of the standby time W to the value acquired by adding the differential value ΔW to the standby time W. The standby time W to be used for the next or later control is updated by carrying out the above-mentioned first to six steps while the mass flow controller is supplying the fluid.

The differential value ΔW required to update the standby time W has been acquired in the fourth step. Thus, a timing of the update of the standby time W may be at any timing between completion of the fourth step and start of the first step of the next control operation.

The controlling section according to the present invention is configured to repeat this control operation each time the set value of the flow rate changes from 0 (zero) to a value that is not 0 (zero) after the control operation including the first to sixth steps is carried out for the first time. Consequently, learning is carried out by the controlling section each time the control operation is repeated to update the standby time W, and as a result, the measured value Tm of the controlled response time can infinitely be brought close to the target value Tt.

Figure 3:
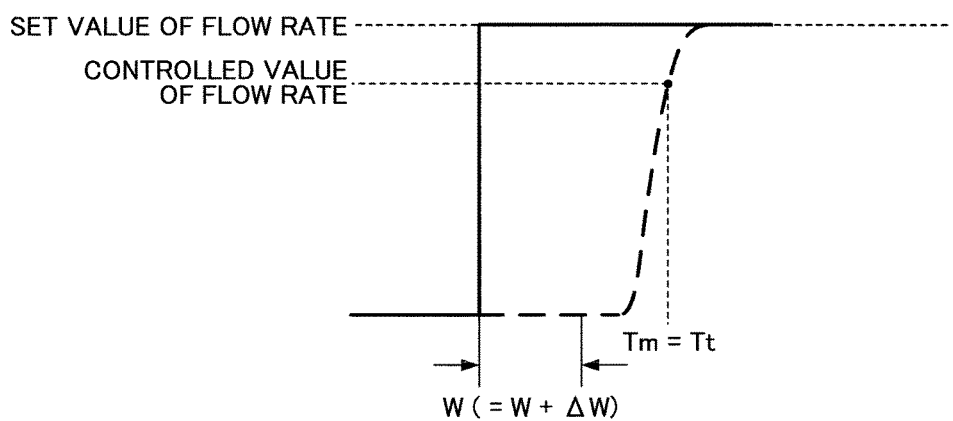
FIG. 3 is a schematic diagram for illustrating a control operation carried out for the second time or later in the method of controlling a flow rate of fluid according to the present invention.

Referring to FIG. 3, FIG. 3 is a schematic diagram for illustrating the control operation carried out for the second time or later according to the present invention. In FIG. 3, a time indicated as the standby time W represents a standby time updated in the sixth step of the previous control operation. In FIG. 3, the standby time W is updated to the new value in this way, and the standby time W is thus longer than that in the case of FIG. 2. As a result, the difference between the target value Tt of the controlled response time and the measured value Tm hardly exists, and thus, both thereof almost match each other.

A final object of the present invention is to decrease a variation of the response time, but the response time cannot be directly adjusted, and hence the decrease in the variation of the controlled response time is achieved by using the standby period as an alternative controlled variable. On this occasion, it is considered that the correspondence between the controlled response time and the response time is not necessarily a simple correspondence, for example, a liner function. However, according to the present invention, the measured value Tm of the controlled response time can infinitely be brought close to the target value Tt by repeating the series of the control operation including the first to sixth steps, resulting in the decrease in the variation of the response time.

Incidentally, the above-mentioned control operation can be implemented by, for example, the calculation device carrying out various types of calculation processing and inputting/outputting the signals in accordance with a program stored in the storage means included in the controlling section.

A description is now given of a preferred embodiment of the present invention, which uses a weight coefficient for the update of the standby time W. According to this embodiment, in the fourth step, the value acquired by subtracting the measured value Tm from the target value Tt of the controlled response time is multiplied by the weight coefficient to calculate the differential value ΔW of the standby time. In other words, the "weight coefficient" is a value serving as an indication value of to what degree the difference between the target value Tt and the measured value Tm acquired in the previous control operation is to be reflected to the next control operation.

When the weight coefficient is 1, in the sixth step, the value acquired by subtracting the value of the measured value Tm from the target value Tt of the controlled response time is directly added to the standby time W, and the standby time W is then updated. When the weight coefficient is 0 (zero), the value acquired by subtracting the value of the measured value Tm from the target value Tt of the controlled response time is not added to the standby time W, and the value of the standby time W is not thus updated. In this case, the result of the learning in the previous control operation is not reflected to the next control operation at all. When the weight coefficient is set to a numerical value between 0 (zero) and 1, the degree of correcting the standby time W decreases compared with the case where the weight coefficient is 1. Thus, as the weight coefficient, a value more than 0 (zero) and equal to or less than 1 can be set.

The following advantage exists in the employment of the weight coefficient for the present invention. It is assumed that the measured value Tm of the controlled response time presents an abnormal value for some reason (for example, influence of noise on an electric signal from the outside of the device or a sudden change in a pressure in a piping system) when the mass flow controller is utilized to control the flow rate of the fluid. When the weight coefficient is set to 1, the standby time W is greatly influenced by this abnormal value, and is thus updated to a value greatly different from the previous value. As a result, the subsequent operation of the mass flow controller may become unstable, and the deviation of the measured value Tm of the controlled response time from the target value Tt may consequently increase. Thus, the time required for the measured value Tm of the controlled response time to reach the target value Tt may increase.

On the other hand, when the weight coefficient is set to a value less than 1, the standby time W is gradually corrected based on the above-mentioned control operation, and the operation is thus less likely to be influenced by the abnormal value. As a result, there is provided such an effect that the operation of the mass flow controller is stabilized. According to the present invention, the weight coefficient may be set to a single value (constant fixed value), or may be selected for use from a plurality of weight coefficients depending on conditions under which the mass flow controller is operated.

Figure 4:
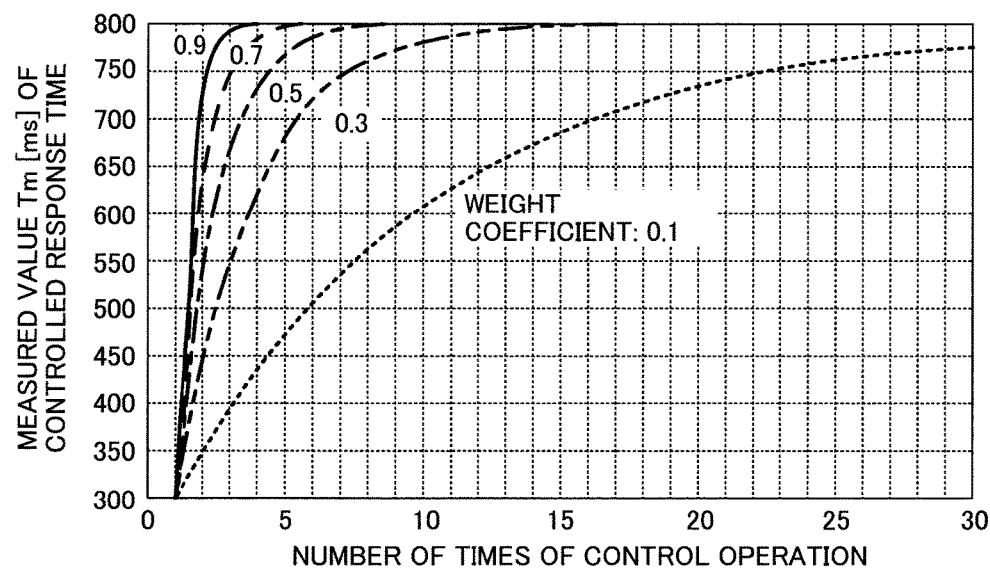
FIG. 4 is a graph for showing a relationship between the number of times of a control operation (number of times of learning) and a measured value of a controlled response time in the method of controlling a flow rate of fluid according to the present invention.

FIG. 4 is a graph for showing a relationship between the number of times of the control operation (number of times of the learning) and the measured value Tm of the controlled response time while the weight coefficient is changed. In this graph, discrete data is connected by smoothed curves for representation. The controlled value of the flow rate is 0.90 time the set value, the initial value of the standby time W is 0.3 s (second) (300 ms), and the target value Tt of the controlled response time is 0.8 s (800 ms). From comparison among graphs at the time when the weight coefficient is set to 0.1, 0.3, 0.5, 0.7, and 0.9, respectively, it is appreciated that, when the value of the weight coefficient is close to 0, the measured value Tm of the controlled response time slowly approaches the target value Tt, but when the value of the weight coefficient is close to 1, the measured value Tm quickly approaches the target value Tt.

According to the embodiment of the present invention, in the fourth step, the value acquired by multiplying the difference between the target value Tt and the measured value Tm of the controlled response time by the weight coefficient is considered as the differential value $\Delta W$ of the standby time. However, according to a modified example of the embodiment of the present invention, in the fourth step, a difference between the target value Tt and the measured value Tm of the controlled response time (for example, a value acquired by subtracting the latter from the former) may be considered as the differential value $\Delta W$, and, in the sixth step, the standby time W may be updated by adding to the standby time W a value acquired by multiplying the differential value $\Delta W$ of the standby time by the weight coefficient.

Figure 5:
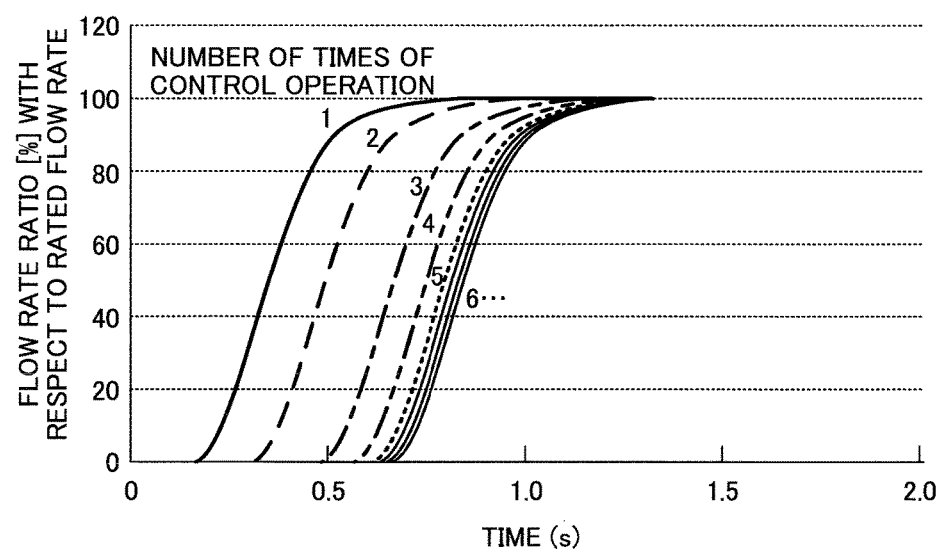
FIG. 5 is a graph for showing a relationship between the number of times of the control operation (number of times of learning) and a response curve in the method of controlling a flow rate of fluid according to the present invention.

FIG. 5 is a graph for showing response curves of the flow rate of the mass flow controller for respective numbers of times of the control operation (respective numbers of times of the learning). The controlled value of the flow rate is 0.90 time the set value, the initial value of the standby time W is 0 (zero) s, the target value Tt of the controlled response time is 1.0 s, and the weight coefficient is 0.5. The horizontal axis of the graph represents the time (s) from the start of the measurement of the elapsed time, and the vertical axis of the graph represents a flow rate ratio (%) with respect to a rated flow rate. It is appreciated that the measured value Tm of the controlled response time is approximately 0.5 s in the first control operation, but infinitely approaches 1.0 s, which is the target value Tt, as the control operation is repeated.

Incidentally, in general, as the change in the set value of the flow rate increases, the response time tends to decrease, and as the change in the set value of the flow rate decreases, the response time tends to increase. However, as described above, the response time is preferably constant independently of the magnitude of the change in the set value of the flow rate. Thus, according to another preferred embodiment of the present invention, the flow rate is divided into a plurality of ranges, and the controlling section stores the controlled value of the flow rate, the standby time W, and the target value Tt of the controlled response time corresponding to each of the plurality of ranges. Further, in the above-mentioned second, third, and fourth steps, the controlling section uses the controlled value of the flow rate, the standby time W, and the target value Tt corresponding to a range including the set value of the flow rate out of the plurality of ranges of the flow rate.

With this configuration, the initial value of the standby time W can be more finely adjusted depending on the range of the set value of the flow rate. Specifically, for example, when the set value of the flow rate is high, the initial value of the standby time W can be set to a relatively large value, and, conversely, when the set value of the flow rate is low, the initial value of the standby time W can be set to a relatively small value. As a result, for the set value of the flow rate over a wide range, the controlled response time can be brought close to the same target value Tt. Thus, even when the set value of the flow rate is high, or, conversely, the set value of the flow rate is low, the same response time can be achieved, and the operation of the mass flow controller can further be stabilized.

Similarly to a common mass flow controller, a mass flow controller according to the present invention includes: a flow meter configured to measure a measured value of a flow rate of fluid; a flow control valve configured to increase/decrease the flow rate; and a controlling section configured to control the flow control valve based on the measured value to adjust the flow rate. Further, the controlling section included in the mass flow controller according to the present invention includes storage means for storing: a set value of the flow rate; a controlled value corresponding to the set value of the flow rate; a standby time W, which is a period from change in the set value of the flow rate from 0 (zero) to a value that is not 0 (zero) until output of an opening signal to the flow control valve; and a target value Tt of a controlled response time, which is a period for the measured value of the flow rate to reach the controlled value of the flow rate after the set value of the flow rate changes from 0 (zero) to the value that is not 0 (zero).

In addition, the controlling section is configured to execute the above-mentioned method (that is, the control operation) of controlling a flow rate of fluid according to the present invention. Specifically, the controlling section is configured to carry out a control operation including: starting measurement of an elapsed time when the set value of the flow rate changes from 0 (zero) to the value that is not 0 (zero); outputting the opening signal corresponding to the set value of the flow rate to the flow control valve when the elapsed time reaches the standby time W; measuring a value of the elapsed time at a time when the measured value of the flow rate reaches the controlled value of the flow rate as a measured value Tm of the controlled response time; calculating a value acquired by subtracting the measured value Tm from the target value Tt as a differential value $\Delta W$ of the standby time W; outputting a closing signal to the flow control valve, stopping the measurement of the elapsed time, and resetting the value of the elapsed time to 0 (zero) when the set value of the flow rate changes from the value that is not 0 (zero) to 0 (zero); and updating a value of the standby time W to a value acquired by adding the differential value $\Delta W$ to the standby time W.

In a mass flow controller according to a preferred embodiment of the present invention, the controlling section is configured to calculate, as the differential value $\Delta W$ of the standby time, a value acquired by multiplying by a weight coefficient the value acquired by subtracting the measured value Tm from the target value Tt. As a result, the correction of the standby time W based on the previous control operation is carried out gradually, and thus the influence of the abnormal value is less likely to be exerted. Consequently, there is provided such an effect that the operation of the mass flow controller is stabilized.

In a mass flow controller according to another preferred embodiment of the present invention: the storage means is configured to store the controlled value of the flow rate, the standby time W, and the target value Tt of the controlled response time corresponding to each of a predetermined plurality of ranges of the flow rate; and the controlling section is configured to use, in the control operation, the controlled value of the flow rate, the standby time W, and the target value Tt corresponding to a range including the set value of the flow rate out of the predetermined plurality of ranges of the flow rate. As a result, the same response time can be achieved by bringing the controlled response time close to the same target value Tt in a wide range of the set value of the flow rate, and thus the operation of the mass flow controller can further be stabilized.

The configuration of the mass flow controller according to the present invention including the above-mentioned controlling section, and the control operation carried out by the mass flow controller are already described in detail in the above description of the method of controlling a flow rate of fluid according to the present invention, and thus a description thereof is omitted here.

A mass flow control system according to the present invention utilizes one or more of the mass flow controllers according to the present invention. Herein, the mass flow control system refers to a system including a combination of a plurality of mass flow controllers and other components, which are intended to control the mass flow rate of the fluid. With this configuration, in a case where one mass flow controller is provided, a mass flow control system having the above-mentioned effect of the present invention can be constructed. Moreover, in a case where two or more mass flow controllers are provided, for example, the response times can uniformly be set to one value for the plurality of mass flow controllers installed on respective pipes that are provided independently for respective types of process gases to be used, and when individual differences exist in the response time, the individual differences can be eliminated.

The invention claimed is:

1. A method of controlling a flow rate of fluid by using a mass flow controller, the method comprising:
   measuring a flow rate of the fluid with a flow meter of the mass flow controller to obtain a measured value;
   controlling a flow control valve of the mass flow controller with a controlling section of the mass flow controller based on the measured value to adjust the flow rate of the fluid;
   storing, in a memory of the mass flow controller, the following:
   a set value of the flow rate;
   a controlled value of the flow rate corresponding to the set value of the flow rate;
   a standby time W, which is a period from a change in the set value of the flow rate from zero to a value that is not zero until output of an opening signal to the flow control valve; and
   a target value Tt of a controlled response time, which is a period of time for the measured value of the flow rate to reach the controlled value of the flow rate after the set value of the flow rate changes from zero to the value that is not zero;
   starting, with the controlling section, measurement of an elapsed time when the set value of the flow rate changes from zero to the value that is not zero;
   outputting, by the controlling section, the opening signal corresponding to the set value of the flow rate to the flow control valve when the elapsed time reaches the standby time W;
   measuring, by the controlling section, a value of the elapsed time at a time when the measured value of the flow rate reaches the controlled value of the flow rate as a measured value Tm of the controlled response time;
   calculating, by the controlling section, a value acquired by subtracting the measured value Tm from the target value Tt as a differential value $\Delta W$ of the standby time W;
   outputting, by the controlling section, a closing signal to the flow control valve, stopping the measurement of the elapsed time, and resetting the value of the elapsed time to zero when the set value of the flow rate changes from the value that is not zero to zero; and
   updating, by the controlling section, a value of the standby time W to a value acquired by adding the differential value $\Delta W$ to the standby time W.

2. The method of controlling a flow rate of fluid according to claim 1, including:
   storing, with the controlling section, the controlled value of the flow rate, the standby time W, and the target value Tt corresponding to each of a predetermined plurality of ranges of the flow rate; and
   using, by the controlling section, the controlled value of the flow rate, the standby time W, and the target value Tt corresponding to a range including the set value of the flow rate out of the predetermined plurality of ranges of the flow rate.

3. The method of controlling a flow rate of fluid according to claim 1, wherein the calculating, by the controlling section, includes calculating as the differential value $\Delta W$ of the standby time, a value acquired by multiplying by a weight coefficient the value acquired by subtracting the measured value Tm from the target value Tt.

4. The method of controlling a flow rate of fluid according to claim 3, including:
   storing, with the controlling section, the controlled value of the flow rate, the standby time W, and the target value Tt corresponding to each of a predetermined plurality of ranges of the flow rate; and
   using, by the controlling section, the controlled value of the flow rate, the standby time W, and the target value Tt corresponding to a range including the set value of the flow rate out of the predetermined plurality of ranges of the flow rate.

5. A mass flow controller, comprising:
   a flow meter configured to measure a measured value of a flow rate of fluid;
   a flow control valve configured to adjust the flow rate; and
   a controlling section configured to control the flow control valve based on the measured value to adjust the flow rate, wherein:
   the controlling section comprises storage means for storing:
   a set value of the flow rate;
   a controlled value of the flow rate corresponding to the set value of the flow rate;
   a standby time W, which is a period from change in the set value of the flow rate from zero to a value that is not zero until output of an opening signal to the flow control valve; and
   a target value Tt of a controlled response time, which is a period for the measured value of the flow rate to reach the controlled value of the flow rate after the set value of the flow rate changes from zero to the value that is not zero; and the controlling section is configured to carry out a control operation comprising:

starting measurement of an elapsed time when the set value of the flow rate changes from zero to the value that is not zero;

outputting the opening signal corresponding to the set value of the flow rate to the flow control valve when the elapsed time reaches the standby time W;

measuring a value of the elapsed time at a time when the measured value of the flow rate reaches the controlled value of the flow rate as a measured value Tm of the controlled response time;

calculating a value acquired by subtracting the measured value Tm from the target value Tt as a differential value ΔW of the standby time W;

outputting a closing signal to the flow control valve, stopping the measurement of the elapsed time, and resetting the value of the elapsed time to zero when the set value of the flow rate changes from the value that is not zero to zero; and updating a value of the standby time W to a value acquired by adding the differential value ΔW to the standby time W.

6. The mass flow controller according to claim 5, wherein:

the storage means is configured to store the controlled value of the flow rate, the standby time W, and the target value Tt corresponding to each of a predetermined plurality of ranges of the flow rate; and the controlling section is configured to use, in the control operation, the controlled value of the flow rate, the standby time W, and the target value Tt corresponding to a range including the set value of the flow rate out of the predetermined plurality of ranges of the flow rate.

7. The mass flow controller according to claim 5, wherein the controlling section is configured to calculate, as the differential value ΔW of the standby time, a value acquired by multiplying by a weight coefficient the value acquired by subtracting the measured value Tm from the target value Tt.

8. The mass flow controller according to claim 7, wherein:

the storage means is configured to store the controlled value of the flow rate, the standby time W, and the target value Tt corresponding to each of a predetermined plurality of ranges of the flow rate; and the controlling section is configured to use, in the control operation, the controlled value of the flow rate, the standby time W, and the target value Tt corresponding to a range including the set value of the flow rate out of the predetermined plurality of ranges of the flow rate.

\* \* \* \* \*